United States Patent [19]

Narasaki

[11] Patent Number: 5,081,381
[45] Date of Patent: Jan. 14, 1992

[54] ELECTROMAGNETIC ACTUATOR WITH LINEAR CONTROL

[75] Inventor: Tetsuji Narasaki, Tsukuba, Japan

[73] Assignee: National Space Development Agency of Japan, Tokyo, Japan

[21] Appl. No.: 637,234

[22] Filed: Jan. 3, 1991

[30] Foreign Application Priority Data

Feb. 19, 1990 [JP] Japan .................................. 2-36349

[51] Int. Cl.$^5$ .......................................... H02K 41/02
[52] U.S. Cl. ...................................... 310/12; 310/14; 901/23
[58] Field of Search ...................... 310/12, 13, 14, 15; 318/135; 901/15, 23, 24; 414/718, 728, 750

[56] References Cited

U.S. PATENT DOCUMENTS

| | | | |
|---|---|---|---|
| 4,439,702 | 3/1984 | Belikov et al. | 310/12 |
| 4,607,197 | 8/1986 | Conrad | 318/135 |
| 4,695,777 | 9/1987 | Asano | 310/12 |

Primary Examiner—Steven L. Stephan
Assistant Examiner—E. To
Attorney, Agent, or Firm—Armstrong, Nikaido, Marmelstein, Kubovcik & Murray

[57] ABSTRACT

An electromagnetic actuator includes a cylindrical rod made of a magnetic substance and having a large number of annular teeth formed on an outer surface thereof at a fixed pitch, and a plurality of annular electromagnets fitted on the cylinder rod. The intervals of the annular electromagnets are set such that the offsets between the annular teeth of the annular electromagnets and the annular teeth of the corresponding cylindrical rod gradually increase. This ensures highly accurate axisymmetric configuration which in turn ensures a completely axisymmetric distribution of the magnetic flux. In consequence, the radial force which acts between the electromagnet and the rod can be reduced, and control over the movement of the rod in the axial direction is thus facilitated.

15 Claims, 9 Drawing Sheets

ELECTROMAGNETIC ACTUATOR WITH LINEAR CONTROL

BACKGROUND OF THE INVENTION

The present invention relates to an electromagnetic actuator which is capable of a highly accurate control.

Electromagnetic linear actuators having, a form in which a step motor is one-dimensionally expanded are known. Such electromagnetic linear actuators are disclosed in, for example, Japanese Utility Model Publication No. 1290/1973. This electromagnetic actuator includes a rod made of a magnetic substance and having teeth at a fixed pitch or a rod on which permanent magnets are disposed at a fixed pitch and a plurality of electromagnets whose surface is toothed in the same manner as that of the rod, with the electromagnets being disposed on the rod. Pulse current is systematically supplied to the individual electromagnets, by which a magnetic field is shifted. A driving force is generated because of the positional offsets between the teeth on the surface of the rod and the teeth on the surfaces of the electromagnets.

Japanese Utility Model Laid-Open No. 116887/1981 discloses an electromagnetic linear actuator which includes a cylindrical coil and a rod made of a magnetic or ferromagnetic substance and disposed on a central axis of the coil. In this electromagnetic linear actuator, a driving force is generated because of an offset of dynamic balance within the magnetic field which is generated by the shape and position of the rod.

However, in the electromagnetic linear actuator of the type disclosed in Japanese Utility Model Publication No. 1290/1973, the magnetic flux density obtained by the energization of the electromagnets is not symmetrical with respect to the axis of the rod, and a balance of the force between the rod and the electromagnets thus varies greatly. This causes a force having a large magnitude to act on the rod retaining mechanism, and makes enhancement of accuracy and response of the actuator control difficult.

In the electromagnetic linear actuator disclosed in Japanese Utility Model Laid-Open No. 116887/1981, a driving force differs depending on the position of the rod, and stroke is small. Furthermore, although the rod can be moved digitally by conducting pulse control on the rod using a stator which temporarily restricts the movement of the rod, it is difficult to quantitatively set the amount of movement of the rod when the movement of the rod is not restricted by the stator. This makes enhancement of the actuator control accuracy impossible.

SUMMARY OF THE INVENTION

An object of the present invention is to provide an improved electromagnetic actuator which is capable of solving the problems of the conventional electromagnetic linear actuators as discussed above.

Another object of the present invention is to provide an improved electromagnetic actuator which assures improved accuracy and response of the drive control.

In order to achieve the above objects, according to one aspect of the present invention, there is provided an electromagnetic actuator which comprises a cylindrical rod made of a magnetic substance and having a large number of annular teeth formed on an outer surface thereof at a fixed pitch, and a plurality of annular electromagnets fitted on the cylindrical rod. Each of said annular electromagnets has a hollow annular electromagnet core whose inner peripheral intermediate portion is notched and which has inner peripheral walls that loosely fit on the cylindrical rod, a large number of annular teeth provided on an inner peripheral surface of the core by the same pitch as that of the annular teeth of said cylindrical rod, and an energizing coil wound within the core. The annular electromagnets are disposed at intervals which ensure that offsets between the annular teeth of the annular electromagnets and said annular teeth of said cylindrical rod gradually increase. The cylindrical rod is driven in an axial direction thereof by energization and de-energization of the electromagnets.

In the electromagnetic actuator arranged in the manner describe above, when the annular electromagnets are energized in sequence, the magnetic flux generated by the electromagnet passes the portion of the surface of the rod which opposes the intermediate notched portion of the core, and thereby closes the magnetic circuit. As a result, a strong axial force acts on the annular teeth of the electromagnet and the annular teeth of the rod which are offset from the annular teeth of the electromagnet until they coincide with each other, and the rod thereby moves in the axial direction thereof and then stops when the teeth are in alignment. Since the rod has a cylindrical form while the core of the electromagnet has a hollow annular ring-like shape, a highly accurate axially symmetrical configuration can be obtained, and a completely axially symmetrical magnetic flux can thus be obtained. This reduces the radial force which acts between the electromagnet and the rod, and facilitates control over the axial movement of the rod.

According to another aspect of the present invention, there is provided an electromagnetic actuator which comprises a cylindrical rod, a plurality of electromagnets, and a restricting electromagnet fitted on the cylindrical rod and coupled to the plurality of annular electromagnets, the restricting electromagnet restricting movement of the cylindrical rod in the axial direction thereof. The cylindrical rod and the electromagnets are the same as those used in the electromagnetic actuator provided in the above aspect of the present invention, with the exception that helical grooves are formed across the annular teeth of the cylindrical rod and of the annular electromagnets in the axial direction of the rod at a fixed pitch on the circumference. The helical grooves formed on the electromagnets have an inclination angle which is different from that of the helical grooves of the cylindrical rod. The cylindrical rod is rotated about its own axis in a state wherein the movement of the cylindrical rod in the axial direction is suspended and is driven in the axial direction thereof in a state wherein rotation of the cylindrical rod about its own axis is suspended.

Furthermore, the cylindrical rod can be rotated about its own axis due to the balance of the magnetic force generated by the annular teeth and the helical grooves in a state in which the axial movement of the cylindrical rod is restricted by the operation of the restricting electromagnet, and can be moved in the axial direction thereof in a state in which the rotation thereof about its axis is suspended, which is achieved by the de-energization of the restricting electromagnet.

DETAILED DESCRIPTION OF THE PREFERRED EMBODIMENTS

Figure 1:
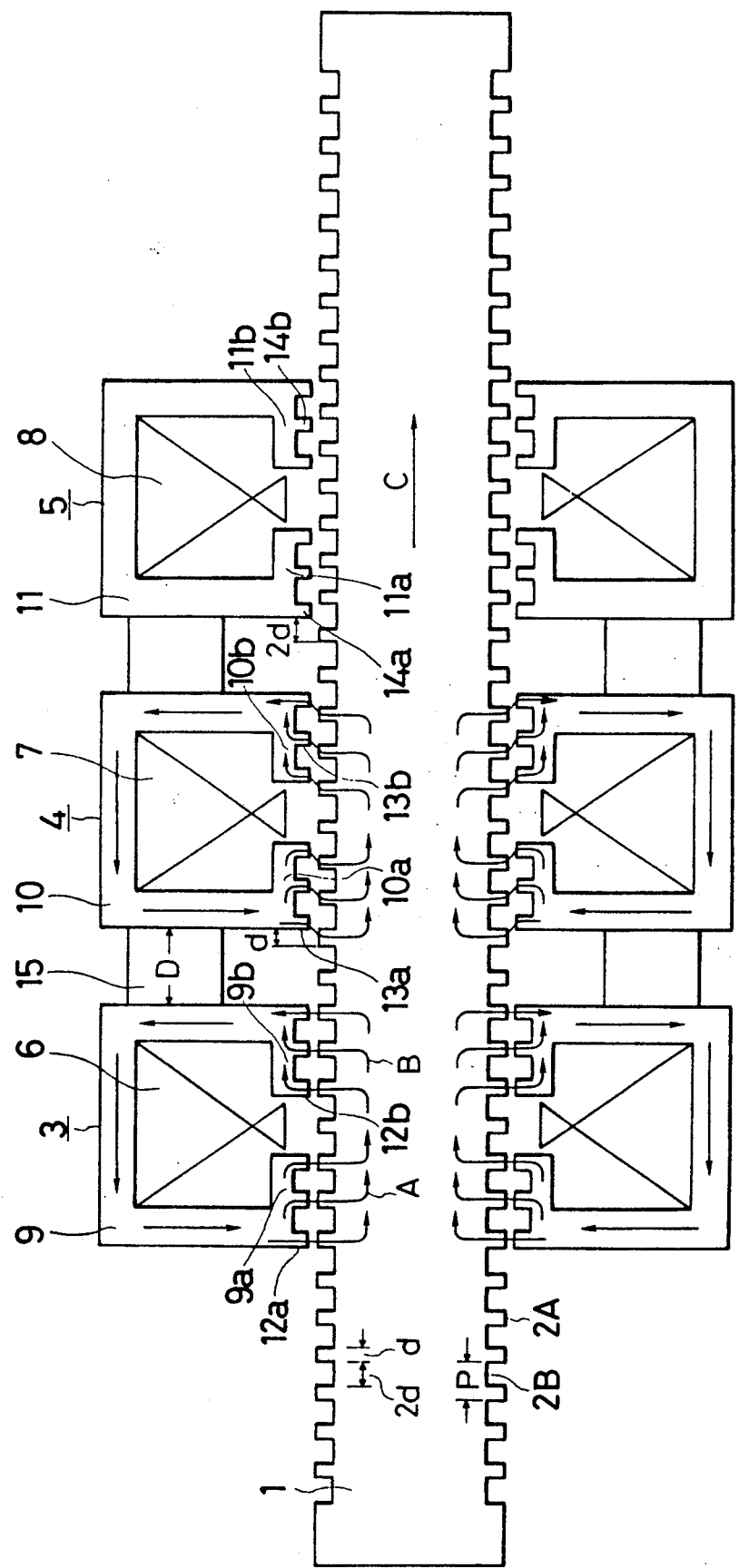
FIG. 1 illustrates the electromagnetic actuator set forth in claim 1.

FIG. 1 illustrates the electromagnetic actuator set forth in claim 1. A cylindrical rod 1 made of a material having a high permeability has teeth 2A and grooves 2B formed on the outer surface thereof. The teeth 2A and grooves 2B are formed over the substantially entire area of the rod 1 by a pitch P relative to the axial direction of the rod 1. Ring-shaped driving electro-magnets 3, 4 and 5 are loosely fitted on the rod 1. The electro-magnets 3, 4 and 5 are respectively composed of coils 6, 7 and 8 and cores 9, 10 and 11. The coils 6, 7 and 8 are wound in a circumferential direction.

The cores 9, 10 and 11 have an annular ring-like shape. Part of the inner peripheral surface of each of the cores 9, 10 and 11 is notched in the circumferential direction to form an opening. The cores 9, 10 and 11 respectively have ring-shaped end surface portions 9a, 9b, 10a, 10b, 11a and 11b on the inner peripheral surfaces thereof on the two sides of the corresponding openings. The end surface portions 9a, 9b, 10a, 10b, 11a and 11b are disposed adjacent to the outer peripheral surface of the rod 1. The end surface portions respectively have teeth 12a, 12b, 13a, 13b, 14a and 14b which have the same form and pitch as those of the teeth 2A formed on the outer peripheral surface of the rod 1. The teeth 12a, 12b, 13a, 13b, 14a and 14b are disposed in opposed relation with and adjacent to the teeth 2A on the outer peripheral surface of the rod 1.

The electromagnetic actuator shown in FIG. 1 is arranged such that, when the teeth 12a and 12b formed on the end surface portions 9a and 9b of the electromagnet 3 are brought into alignment with the teeth 2A formed on, in terms of the position by the adjustment of the distances between the electromagnets 3, 4 and 5, as shown in FIG. 1, the teeth 13a and 13b of the electromagnet 4 are offset from the teeth 2A of the rod 1 by a length equal to width d of the tooth 2A. At that time, the teeth 14a and 14b of the electromagnet 5 are offset from the teeth 2A of the rod 1 by a length equal to width 2d of the groove 2B. The distances between the electromagnets 3, 4 and 5 are adjusted by the presence of spacers 15 made of a non-magnetic substance such that the offsets between the teeth of the individual electromagnets and the teeth 2A of the rod 1 gradually increase by a length d.

When current is supplied to the coil 6 of the electromagnet 3, the core 9 of the electromagnet 3 and the teeth 12a on the end surface portion 9a of the core 9, the portion of the rod 1 which opposes the opening of the core 9, the teeth 2A of the rod which oppose the teeth 12b on the end surface portion 9b of the core 9, and teeth 12b on the end surface portion 9b of the core 9 are magnetized in sequence in that order, and a magnetic circuit which goes around the coil in the directions indicated by arrows A and B is thereby formed.

A non-magnetic material may be filled in the grooves 2B between the teeth 2A of the rod 1 and in the similar grooves formed between the teeth on the end surface portions of the cores 9, 10 and 11 in order to make the outer peripheral surface of the rod 1 and the inner peripheral surfaces of the end surface portions of the electromagnets 3, 4 and 5 smooth.

Figure 2:
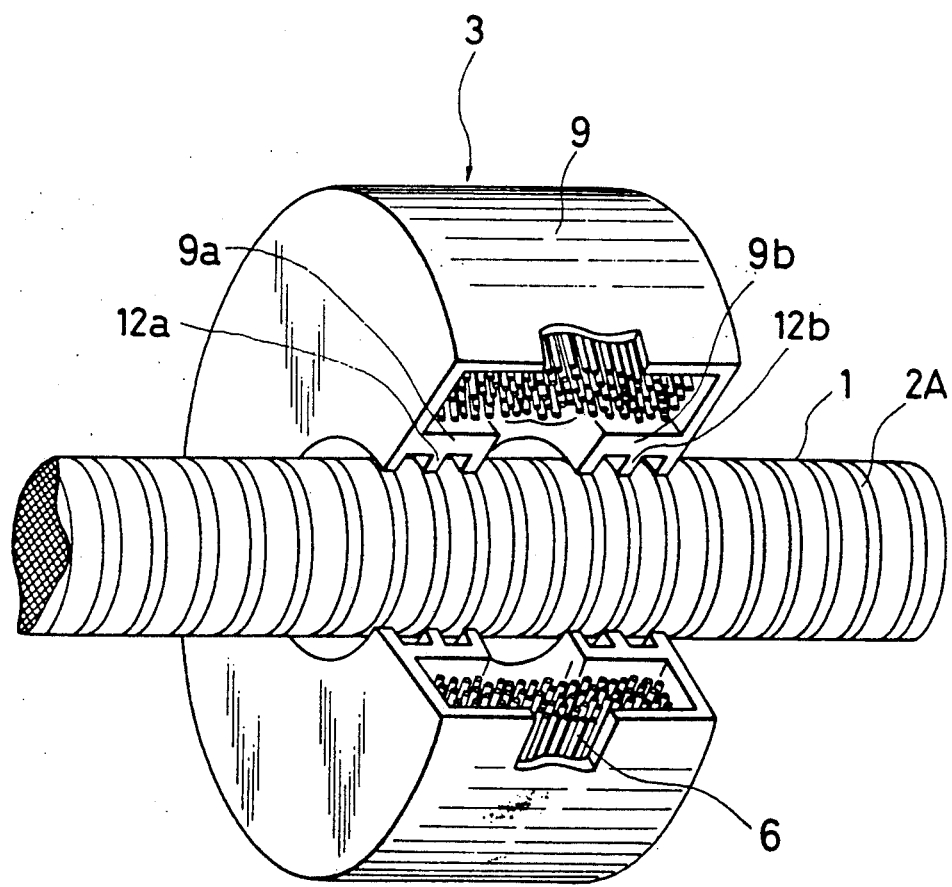
FIG. 2 is a perspective view, partly in cross section, of an electromagnet portion shown in FIG. 1.

FIG. 2 is a perspective view, partly in cross section, of electro-magnet 3 and rod 1. The intermediate portion of the inner peripheral surface of the hollow annular ring-like core 9 of the electromagnet 3 is notched to form an opening. On the end surfaces 9a and 9b formed on the two sides of the opening are formed the teeth 12a and 12b having the same configuration as that of the teeth 2A formed on the outer peripheral surface of the rod 1. The inner periphery of coil 6 is wound around the core 9.

The operation of the actuator set forth in claim 1 will be described below with reference to FIGS. 1 and 2. First, current is supplied to the electromagnet 3. This stops rod 1 stop at a position where the teeth 12a and 12b of the electromagnet 3 are in alignment with the teeth 2A of the rod 1 which face the teeth 12a and 12b. Next, the electro-magnet 3 is de-energized and the electromagnet 4 is then energized. At that time, an attracting force acts in the axial direction of the rod 1 on the teeth 2A of the rod 1 separated from the teeth 13a and 13b of the electromagnet 4 by distance d, and the rod 1 thereby moves by distance d in the direction indicated by the arrow C and stops at a position where the teeth 13a and 13b of the electromagnet 4 are in alignment with the teeth 2A of the rod 1. This is equivalent to the teeth 14a and 14b of the electromagnet 5 moving by length d in the direction opposite to that indicated by the arrow C in relation to the teeth 2A of the rod 1, and the offset between the teeth 14a and 14b of the electromagnet 5 and the teeth 2A of the rod 1 thus decreases from distance 2d to distance d.

Subsequently, the electromagnet 4 is de-energized and the electromagnet 5 is energized. This moves the rod 1 by length d in the direction indicated by the arrow C to the position where the teeth 11a and 11b of the electromagnet 5 are in alignment with the teeth 2A of the rod 1 and then stops. Concurrently with this, the teeth 12a and 12b on the end surface portions 9a and 9b of the first driven electromagnet 3 move away from the teeth 2A of the rod 1 by distance d. Consequently, deenergization of the electromagnet 5 and energization of the electromagnet 3, conducted in a subsequent step of the operation, cause the rod 1 to move in the direction C by another d to a position which is separated by pitch P (=3d) from its initial position when the electromagnet 3 is first energized.

When energization of the electromagnets 3, 4 and 5 is cyclically repeated in the manner described above, the rod 1 continues to move sequentially by distance d in the direction indicated by the arrow C. The rod 1 moves by distance d steps in the direction opposite to that indicated by the arrow C by reversing the order in which the electromagnets 3, 4 and 5 are energized, i.e., by energizing the electromagnet 5 first, next the electromagnet 4 and then the electromagnet 3. Also, the movement of the rod 1 in the axial direction thereof can be restricted by continuing the supply of current to one or two of the electromagnets 3, 4 and 5. It is thus possible to control the position of the rod 1 in the axial direction and the speed at which the rod 1 moves by changing the order in which current is supplied to the electromagnets 3, 4 and 5, the number of pulses, and the frequency at which the pulses are applied.

Figure 3A:
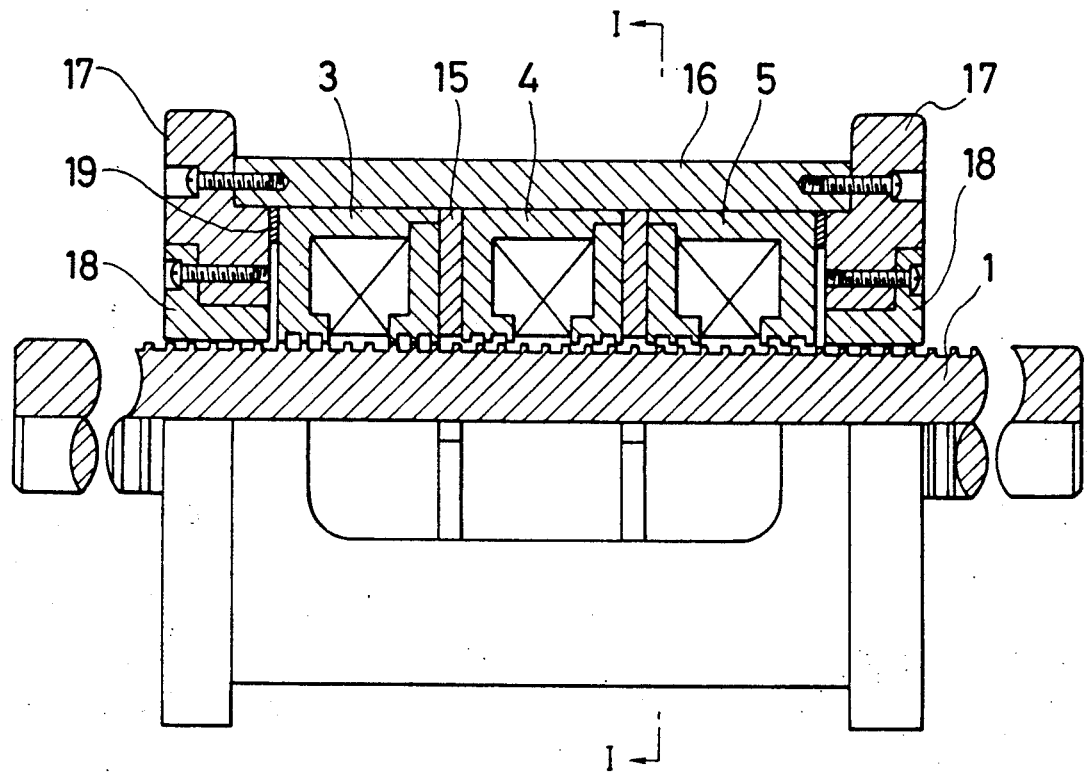
FIG. 3A is a plan view, partly in cross-section, of a first embodiment of the electromagnetic actuator set forth in claim 1.
Figure 3B:
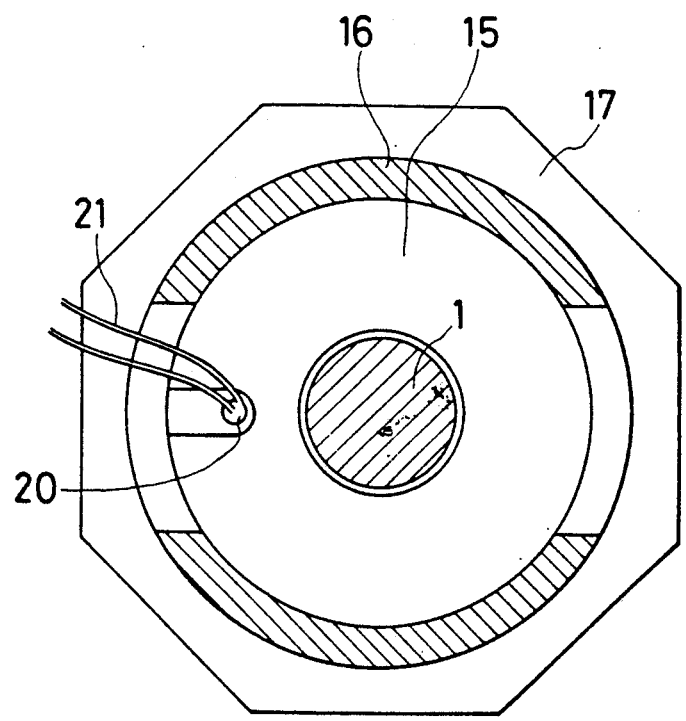
FIG. 3B is a section taken along the line I—I of FIG. 3A.

FIGS. 3A and 3B show a first embodiment of an electromagnetic actuator structured on the basis of the principle shown in FIGS. 1 and 2. FIG. 3B is a section taken along the line I—I of FIG. 3A. In FIGS. 3A and 3B, the same reference numerals are used to denote parts which are the same as those shown in FIG. 1. In FIGS. 3A and 3B, a reference numeral 16 denotes an outer cylinder for covering and pressing the electromagnets 3, 4 and 5; side plates 7 for fixing the electromagnets 3, 4 and 5 and the outer cylinder 16 by means of screws or the like; bearings 18 for maintaining constant the gap between the outer peripheral surface of the rod 1 driven by the electromagnets 3, 4 and 5 and the end surface portions of the cores of the electromagnets 3, 4 and 5 to smooth the movement of the rod 1; 19, packings; 20; a lead port; and 21, a lead. Pulse current is supplied to the electromagnets 3, 4 and 5 via the leads 21 to control axial movement of the rod 1. The operation of this embodiment is the same as that shown in FIG. 1.

Figure 4A:
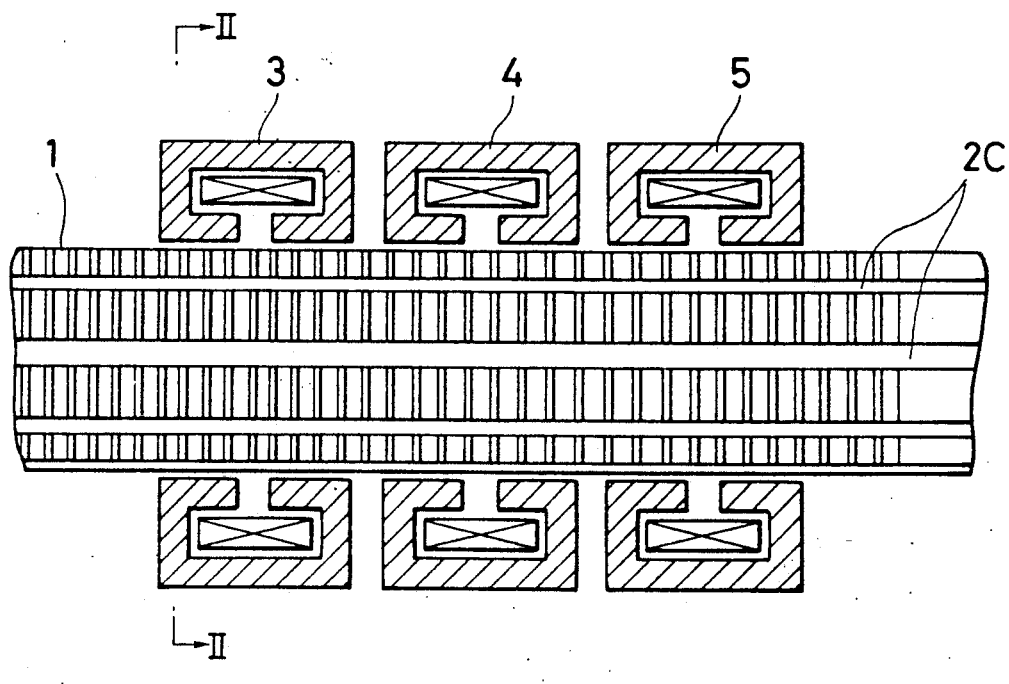
FIG. 4A is a plan view, partly in cross-section, of a second embodiment of the electromagnetic actuator set forth in claim 1.
Figure 4B:
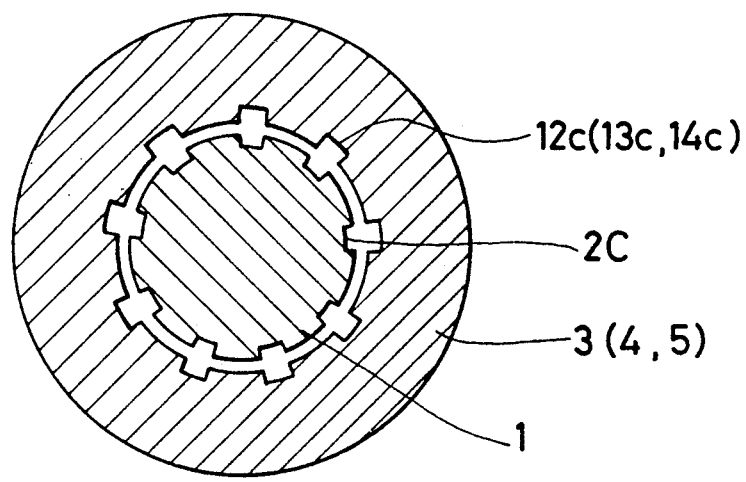
FIG. 4B is a section taken along the line II—II of FIG. 4A.

FIG. 4A is a plan view, partly in cross section, of a second embodiment of the electromagnetic actuator constructed as shown in FIGS. 1 and 2, and FIG. 4A is a section taken along the line II—II of FIG. 4A. In this embodiment, grooves 2C, 12c, 13c and 14c are respectively formed on the outer peripheral surface of the rod 1 and the core end surface portions of the electromagnets 3, 4 and 5 are perpendicular to the direction of the teeth and parallel to each other in the axial direction of the rod 1. Formation of the grooves 2C on the outer surface of the rod 1 and of the grooves 12c, 13c and 14c allows a magnetic force to act during the operation of the actuator in such a manner that the grooves 2C of the rod 1 coincide with the grooves 12c, 13c and 14c on the core end surface portions, by which the rod 1 can be moved in the axial direction without being rotated.

Figure 5A:
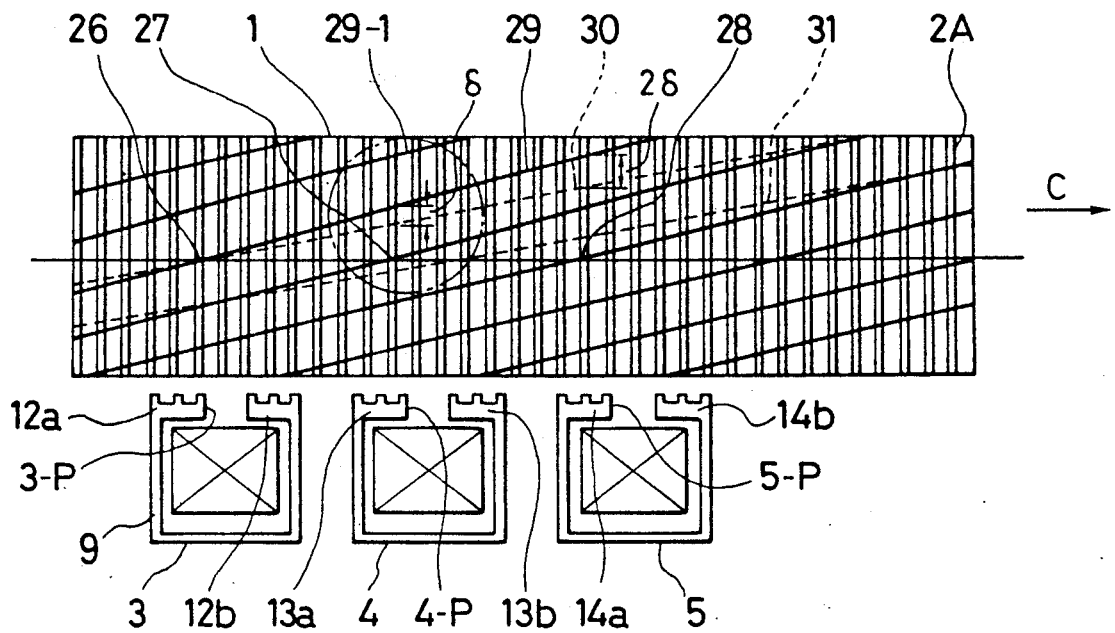
FIG. 5A illustrates the electromagnetic actuator set forth in claim 2.
Figure 5B:
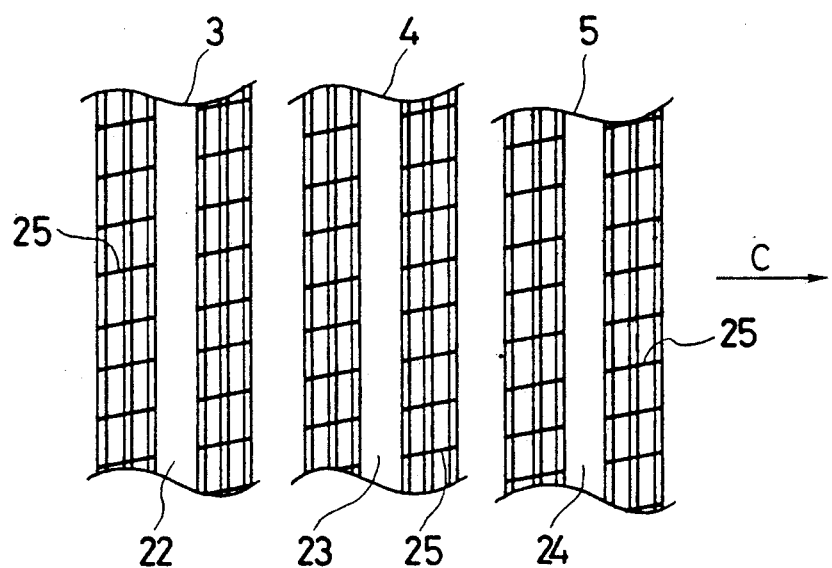
FIG. 5B is an exploded view of a core end surface portion of an electromagnet of FIG. 5A.

FIGS. 5A and 5B illustrate the electromagnetic actuator set forth in claim 2. The electromagnetic actuator set forth in claim 2 differs from the electromagnetic actuator set forth in claim 1 in that the rod can rotate about its own axis at a given position and the rod can move in the axial direction without rotating about its own axis.

FIG. 5A shows the positional relation between the teeth 2A on the outer surface of the rod 1 shown in FIG. 1 and the teeth 12a, 12b, 13a, 13b, 14a and 14b of the electromagnets 3, 4 and 5. FIG. 5B shows the teeth 12a, 12b, 13a, 13b, 14a and 14b on the end surface portions of the cores 9, 10 and 11 of the electromagnets 3, 4 and 5 which are exploded in the circumferential direction thereof. In FIG. 5B, reference numerals 22, 23 and 24 respectively denote the openings formed on the inner peripheral surfaces of the cores of the electromagnets 3, 4 and 5. Solid lines 25 indicate helical grooves extending in the direction indicated by the arrow C across the teeth 12a, 12b, 13a, 13b, 14a and 14b of the electromagnets 3, 4 and 5. The grooves 25 are equally spaced on the circumference of the core end surface portions and formed by partially notching the teeth 12a, 12b, 13a, 13b, 14a and 14b.

In FIG. 5A, reference numerals 26, 27 and 28 denote the axial positions of the teeth 2A on the outer surface of the rod 1 which respectively correspond to reference points 3-P, 4-P and 5-P representing the positions of the typical teeth of the electromagnets 3, 4 and 5. A reference numeral 29 denotes a helical groove formed on the outer surface of the rod 1 in such a manner that it extends in the axial direction indicated by the arrow C and equally spaced on the circumference of the rod, like the grooves 25 formed on the teethed portions of the electromagnets 3, 4 and 5. A reference numeral 30 denotes a projected line formed by projecting the helical grooves 25 shown in FIG. 5B on the outer surface of the rod 1. The electromagnetic actuator shown in FIG. 5A employs three electromagnets, and is arranged such that the rod 1 can be moved in the direction indicated by the arrow C by the distance d which is equal to ⅓ of the pitch P of the tooth by one operation of the electromagnets in which the supply of pulse current to one of the electromagnets is suspended and concurrently pulse current is supplied to the subsequent electromagnet.

Next, the function of the helical groove 29 on the outer surface of the rod 1 and of the helical grooves 25 formed on the core end surface portions in the direction indicated by the arrow C will be described below in detail. In FIG. 5A, at the position 26 of the tooth 2A of the rod 1 corresponding to the reference point 3-P of the electromagnet 3, the groove 29 of the rod 1 is in alignment with the projected line 30 of the groove 25 of the electromagnet. However, at the position 27 of the tooth 2A of the rod 1 corresponding to the reference point 4-P of the electromagnet 4, the groove 29 is separated from the projected line 30 of the groove 25 in the circumferential direction by δ. At the position 28 of the tooth 2A of the rod 1 corresponding to the reference point 5-P of the electromagnet 5, the offset between the groove 29 and the projected line 30 is 2δ.

First, current is supplied to the electromagnet 4 while the movement of the rod 1 in the direction indicated by the arrow C is being restricted by means of a restricting electromagnet (not shown). This rotates the rod 1 about its own axis and thereby displaces the groove 29 on the circumference of the rod by length δ and brings it in alignment with the projected line 30 of the groove 25 of the electromagnet 4 at the position 27. That is, rotation of the rod 1 stops at a rotational angle at which the average value of the circumferential positions of the notches of the teeth of the electromagnet 4 coincides with the average value of the circumferential positions of the notches of the teeth 2A of the rod 1 which opposes the electromagnet 4. Concurrent with the coincidence of the groove 29 with the projected line at the position 27, the circumferential distance between the groove 29 and the projected line 30 of the groove 25 at the position 28 of the tooth 2A of the rod 1 reduces from 2δ to δ.

Next, current is supplied to the electromagnet 5. This rotates the rod 1 about its own axis and thereby further displaces the groove 29 by length δ. Rotation of the rod 1 stops at a rotational angle at which the groove 29 at the position 28 coincides with the projected line 30 of the groove 25. At that time, a groove 29-1 located adjacent to the groove 29 moves toward the projected line 30 of the groove 25 on the core end surface portion of the electromagnet at the position 26 and is located at a position which is separated by the distance δ. Application of the current to the electromagnet 3 therefore further rotates the rod 1 about its own axis by an angle corresponding to the circumferential length δ.

The rod 1 can be rotated about its own axis at intervals of δ by supplying pulse current to the electromagnets 3, 4 and 5 in sequence and at the same time by suspending supply of pulse current to the preceding electromagnet. In one cycle of the operation in which pulse current is supplied to the electromagnets 3, 4 and 5 in sequence, the rod 1 rotates by one circumferential pitch of the helical groove 29, and the groove 29 at the position 26 thereby comes into alignment with a projected line 31 of an adjacent groove 25 separated on the circumference from the projected line 30 of the groove 25 by length 3δ. The rod 1 continues to rotate by repeating the above-described energization of the electromagnets 3, 4 and 5.

Figure 5C:
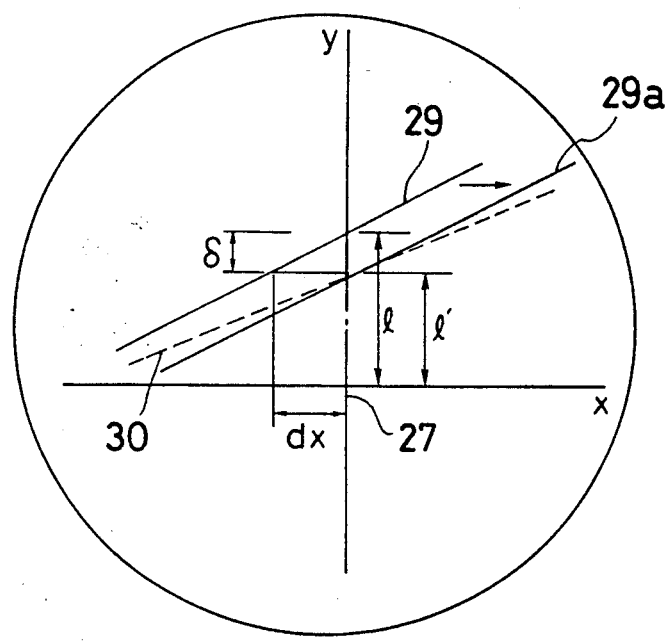
FIG. 5C is an enlarged view, partly omitted, of a portion circled in FIG. 5A.

Next, the operation conducted to drive the rod 1 in the axial direction indicated by the arrow C in a state in which rotation thereof about its own axis is restricted will be described. FIG. 5C is an enlarged view, with parts being omitted, of the portion circled in FIG. 5A, showing the relation between the groove 29 on the outer surface of the rod 1 and the projected line 30 of the groove 25 of the electromagnet 4. When the rod 1 moves in the direction indicated by the arrow C by length dx by de-energization of the electromagnet 3 and energization of the electromagnet 4, the groove 29 on the outer surface of the rod also moves in a parallel fashion in the direction indicated by the arrow C by length dx and is located at a position indicated by 29a. This is equivalent to the groove 29 rotating about the axis of the rod at the position 27 by the length δ. Therefore, when the projected line 30 of the groove 25 at the position 27 is separated from the helical groove 29 on the circumference of the rod by the length δ, the operation of the electromagnet 4 brings the helical groove 29 into alignment with the projected line 30 of the groove 25. That is, the notched portion of the teeth of the electromagnet 4 comes into alignment with the notched portion of the teeth on the outer surface of the rod, by which the magnetic force is balanced. Accordingly, the rod 1 moves in the axial direction by the length dx without rotating about its own axis.

At that time, at the position 28 of the tooth of the rod 1 which corresponds to the tooth of the electromagnet 5, the helical groove 29 on the outer surface of the rod moves in the direction indicated by the arrow C in a parallel fashion by the operation of the electromagnet 4, and the circumferential distance between the helical groove 29 and the projected line 30 of the groove 25 thus reduces from 2δ to δ. Therefore, de-energization of the electromagnet 4 and energization of the electromagnet 5 move the rod 1 in the axial direction by the length dx and thus displaces the helical groove 29 at the position 28 on the circumference by the length d to a position at which it is in alignment with the projected line 30 of the groove 25. That is, when the helical groove 25 of the electromagnet 3 is located across the helical groove 29 of the rod 1 and when the helical groove 25 of the electromagnet 4 is thus separated from the helical groove 29 by a length δ on the circumference of the rod, the operation of the electromagnet 4 moves the rod 1 in the axial direction by the length dx and thus displaces the helical groove 29 on the outer surface of the rod 1 in the circumferential direction by the length equal to a displacement δ caused by the slope of the helical groove 29. In consequence, at the reference position of the electromagnet 4, i.e., at the position 27, the groove 29 of the rod 1 comes into alignment with the groove 25 of the electromagnet, and the rod 1 thus moves in the axial direction thereof by the length dx without rotation. The operation of the subsequent electromagnet 5 further moves the rod by the length dx and displaces the helical groove 29 on the surface of the rod in the circumferential direction by the length δ to a position at which it is in alignment with the groove 25 of the electromagnet 5.

When the circumferential pitch of the helical groove 25 of the electromagnet and the circumferential pitch of the helical groove 29 of the rod 1 are set to 3δ, the sequential operation of the electromagnets 3, 4 and 5 and the operation of the electromagnet 3 move the rod in the axial direction by the distance P ($P=3dx=3d$) and displaces the groove 29 at the position 26 in the circumferential direction by the length 3δ to a position where it is in alignment with the projected line 31 located adjacent to the projected line 30 of the groove 25. In the subsequent cycle of the operation of the electromagnets 3, 4 and 5, the helical groove 29 crosses the helical grooves of the electromagnets 3, 4 and 5 in sequence. Hence, it is possible to move the rod 1 in the axial direction thereof without rotating it about its own axis by repeating the cyclic operation of the electromagnets 3, 4 and 5.

The slope of the groove 29 and of the projected line 30 of the groove 25 shown in FIGS. 5A and 5C are determined in the manner described below. Circumferential displacement l of the groove 29 between the positions 26 and 27 of the rod which correspond to the reference points 3-P and 4-P of the electromagnets 3 and 4 is expressed by $l=3\delta\cdot n_p$ ($n_p$: the number of pitches of the teeth between the positions 26 and 27), and circumferential displacement l' of the projected line 30 between the positions 26 and 27 is expressed by $l'=l-\delta$. Hence, slope $a_{29}$ of the groove 29 is expressed by $$a_{29} \approx \frac{\delta}{dx} = \frac{3\delta}{P},$$

and slope $a_{30}$ of the projected line 30 is expressed by $$a_{30} = \frac{\delta(3n_p - 1)}{n_p \cdot P}.$$

The circumferential pitch of the helical grooves must not be very small. However, it is impossible to increase the value of the slope from the viewpoints of the machining technique and distribution of the magnetic flux determined by the form of the teeth formed by the intersection of the teeth and the helical groove. In a case where δ is about ⅓ of the pitch P, the slopes $\alpha_{29}$ and $\alpha_{30}$ are about 1, which is too large.

Figure 5D:
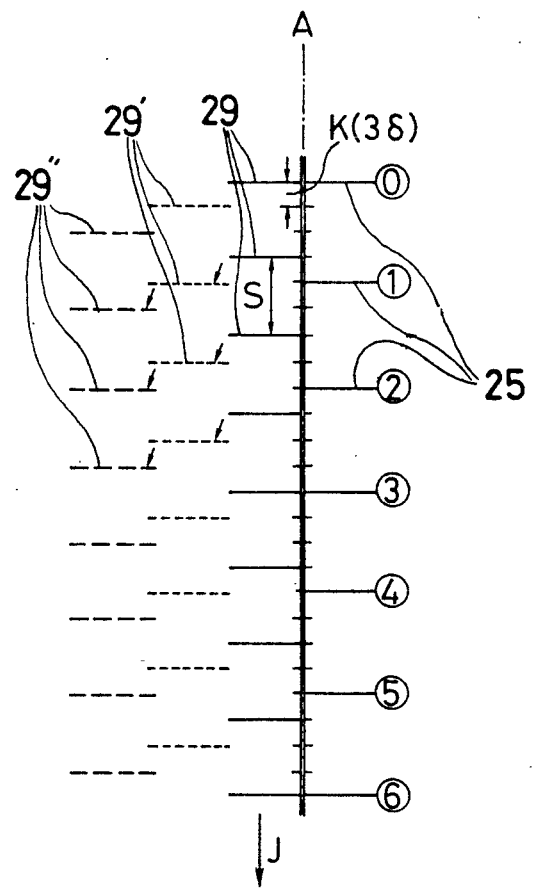
FIG. 5D illustrates the circumferential intervals of the helical grooves.

The method of increasing the circumferential pitch of the helical grooves 25 and 29 respectively formed on the end surface portions of the electromagnet cores and on the outer surface of the cylindrical rod 1 without increasing the slope of the helical grooves 25 and 29 will be explained with reference to FIG. 5D. FIG. 5D shows the positional relationship in the circumferential direction between the helical groove 29 of the rod 1 and the helical groove 25 of the electromagnet 3 at the position 26 on the outer surface of the rod of the electromagnetic actuator shown in FIG. 5A. The right side portion of a central line A shows the arrangement of the helical grooves 25 in the circumferential direction of the core end surface portion of the electromagnet 3. The position of the grooves 25 is fixed. The left side portion of the central line A shows the arrangement of the helical groove 29 on the circumference of the outer surface of the rod. The helical groove 29 is displaced in the circumferential direction indicated by "j" by the rotation or movement of the rod 1 in the axial direction thereof.

As stated above, in one cycle of the operation of the electromagnets 3, 4 and 5 and restricting electromagnet, the rod 1 rotates and the helical groove 29 thereby moves in the circumferential direction by the distance 3δ and is located at a position 29′ indicated by a broken line. Even in the case where the rod 1 moves in the axial direction without rotation, the helical groove 29 at the position 26 is displaced in the circumferential direction by 3δ, like the case of the rotation of the rod, and is located at the position 29′ indicated by the broken line.

If the displacement 3δ of the helical groove 29 at the position 26 in the circumferential direction is a unit length K, the circumferential pitch of the helical groove 29 shown in FIG. 5A is K, and the circumferential pitch of the helical groove 25 is also K. In consequence, when the helical groove 29 is displaced on the circumference by the distance K, it coincides with a helical groove located adjacent to the helical groove 25 at a position separated from the helical groove 25 in the circumferential direction by the distance K. However, in the case of the helical groove shown in FIG. 5D, the circumferential pitch of the helical groove 29 shown on the left side of the central line A is an integral multiple (three times in the case shown in FIG. 5D) of the unit length K, and the circumferential pitch of the helical groove 25 shown on the right side of the line A is a length obtained by multiplying the unit length K by a value which is the integer plus one (which is four in the case shown in FIG. 5D). The helical grooves 25 are in alignment with the helical grooves 29 only at the positions ⓪, ③, ⑥, . . . of the helical grooves shown on the right side of FIG. 5D.

When the helical groove 29 is displaced by the distance K in the circumferential direction J and is located at the position 29′ by one cycle of the operation of the electromagnets 3, 4 and 5, the helical groove 29 coincides with the helical groove 25 shown on the right side of the line A at the circumferential positions indicated by symbols ①, ④, . . . , which are at every three helical grooves 25 and which are at every four helical grooves 29. Moreover, the helical grooves 25 and 29 coincide with each other at positions corresponding to every three helical grooves 25 and to every four helical grooves 29. The intervals between the positions at which the both helical grooves 25 and 29 coincide with each other are calculated by $3\times 4\times K = 12K = 36\delta$.

When the electromagnets 3, 4 and 5 are operated in another cycle, the helical groove 29 is displaced by the distance K in the direction 'J' and is located at a position 29″ indicated by the broken line. At that time, the helical grooves 25 and 29 coincide with each other at positions of the helical groove 25 indicated by symbols ②, ',crc/5/, . . . . That is, each time the helical groove 29 is displaced by the distance K in the circumferential direction, the positions at which the helical grooves 29 and 25 coincide with each other and which are separated by intervals 12K shift in the direction "j" the distance 4K at one displacement, that is, the positions at which the helical grooves 29 coincide with the helical groove 25 move on to the subsequent helical grooves.

In the above example, the circumferential pitches of the helical grooves 29 and 25 are respectively three and four times K. When the factors for the helical grooves 29 and 25 are in general respectively integers n and (n+1), the pitch of the helical groove 29 is expressed by $nK = 3n\delta$, and the pitch of the helical grooves 25 is expressed by $(n+1)K = 3n\delta + 3\delta$. Hence, when the circumferential pitch of the helical groove is set to a constant value 'c', the displacement δ of the helical groove 29 on the outer surface of the rod in the circumferential direction, which is caused by the operation of one electromagnet, is expressed by $\delta = c/3n$. The larger n, the smaller δ. The slopes $\alpha_{29}$ and $\alpha_{30}$ of the helical grooves 29 and 25 are respectively expressed by:

$$\alpha_{29} = 3\delta/P = c/nP$$

$$\alpha_{30} = \{c(3n_p-1)\}/\{3n \cdot n_p \cdot P\}$$

Helical grooves formed partially on the two end surface portions of the electro-magnet cores on the two sides of the reference points 3-P, 4-P and 5-P of the electromagnets assure accurate rotation and movement of the rod in the axial direction than the helical grooves formed over the entire axial length of the two end surface portions.

Figure 6A:
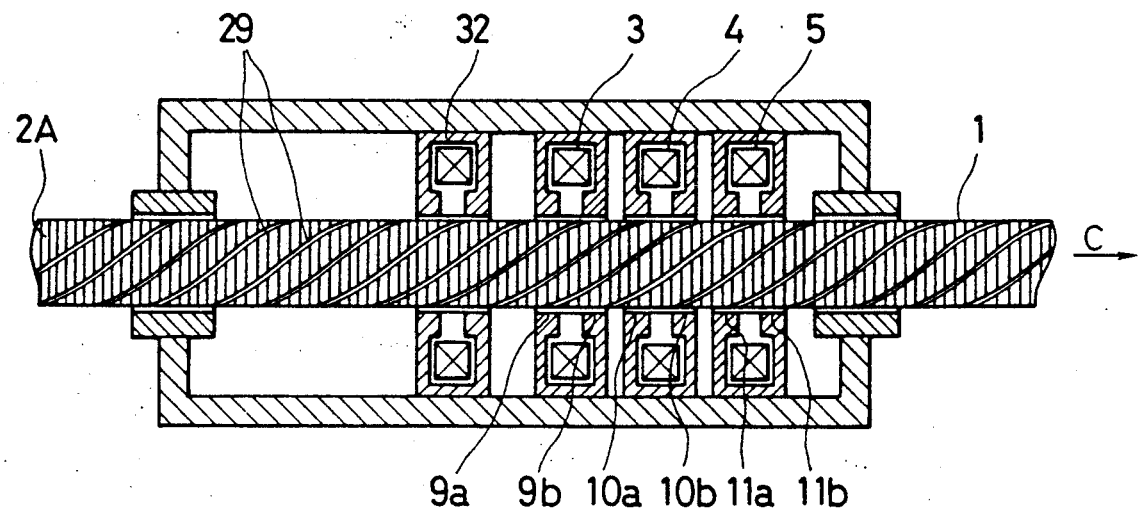
FIG. 6A is a plan view, partly in cross-section, of a first embodiment of the electromagnetic actuator set forth in claim 2.
Figure 6B:
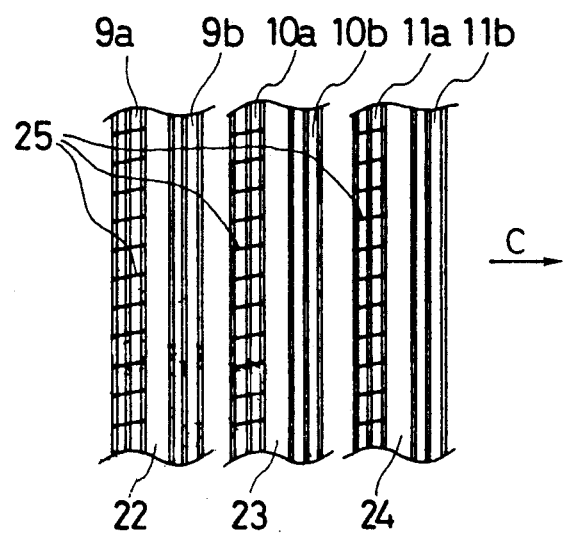
FIG. 6B is an exploded view of a core end surface portion of the electromagnet of FIG. 6A.

A first embodiment of the electromagnetic actuator set forth in claim 2 shown in FIGS. 5A to 5D will be described below with reference to FIGS. 6A and 6B. In FIGS. 6A and 6B, the same reference numerals are used to denote parts which are the same as those shown in FIGS. 1, and 5A to 5D. The cylindrical rod 1 has the teeth 2A formed at equal intervals in the axial direction thereof. The rod 1 also has the helical grooves 29 formed at equal intervals in the circumferential direction. The helical grooves 29 extend in the axial direction of the rod across the teeth 2A. The end surface portions 9a, 9b, 10a, 10b, 11a and 11b of the cores of the electromagnets 3, 4 and 5 have the teeth having the same form as that of the teeth 2A of the rod 1 and the same helical grooves as the helical grooves 25 shown in FIG. 5B. An electromagnet 32 has teeth having the same configuration as that of the teeth formed on the end surface portions of the cores of the electromagnets 3, 4 and 5. However, the electromagnet 32 does not have the helical groove 25. The electromagnet 32 is coupled to the other electromagnets 3, 4 and 5 and restricts the movement of the rod 1 in the axial direction.

When the electromagnets 3, 4 and 5 are energized in sequence in a state in which the movement of the rod 1 in the axial direction is restricted by the energization of the electromagnet 32, the rod 1 rotates the distance δ at the operation of one electromagnet. The rod 1 continues to rotate by repeating the operation of the electromagnets 3, 4 and 5 cyclically in the manner described above.

Rotation of the rod 1 is reversed by reversing the order in which the electromagnets 3, 4 and 5 are operated.

When the electromagnets 3, 4 and 5 are operated in sequence in a state in which the restricting electromagnet 32 is not operated, the rod 1 moves in the axial direction thereof. The rod 1 continues to move in the axial direction in a state in which rotation about its own axis is stopped by cyclically repeating the operation of the electromagnets 3, 4 and 5. The rod 1 moves in the opposite direction without rotating about its own axis by reversing the order in which the electromagnets 3, 4 and 5 are energized.

FIG. 6B shows an example of short helical grooves 25 formed on the end surface portions of the cores of the electromagnets. In this example, the helical grooves having the same form as that of the helical grooves 25 shown in FIG. 5B are formed only on the end surface portions 9a, 10a and 11a of the electromagnets 3, 4 and 5.

Figure 7:
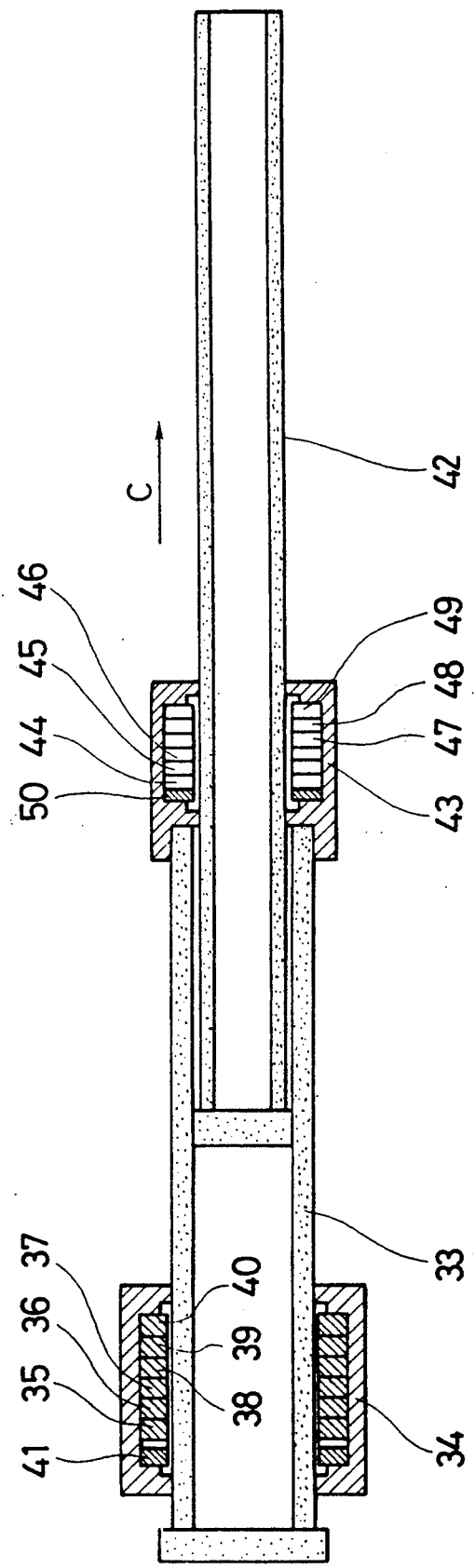
FIG. 7 shows a second embodiment of the electromagnetic actuator set forth in claim 2.

FIG. 7 is a cross-section showing a second embodiment of the electromagnetic actuator set forth in claim 2. In FIG. 7, reference numeral 33 denotes a cylindrical rod; and 34 denotes an electromagnet driving device which contains six electromagnets 35 to 40 and an axial movement restricting electromagnet 41. The rod 33 and the driving device 34 in combination form a first-stage actuator which is operated in the same manner as that of the operation the embodiment shown in FIGS. 6A and 6B. A reference numeral 42 denotes a cylindrical rod of a second-stage actuator which has a outer diameter smaller than the inner diameter of the cylindrical rod 33 of the first-stage actuator. The cylindrical rod 42 is accommodated within the cylindrical rod 33 of the first-stage actuator. A reference numeral 43 denotes an electromagnet driving device for the second-stage actuator which contains six electromagnets 44 to 49 and a restricting electromagnet 50. The electromagnet driving device 43 is fixed to the distal end of the cylindrical rod 33 of the first-stage actuator. A third-stage actuator may be mounted on the distal end of the cylindrical rod 42 of the second-stage actuator.

The cylindrical rod of an actuator of a subsequent stage is accommodated within the cylindrical rod of an actuator of a preceding stage, and the electromagnet driving device of a subsequent stage is mounted on the distal end of the cylindrical rod of the actuator of a preceding actuator. The electromagnetic actuator of this embodiment is a multi-stage extension type actuator which consists of a plurality of actuator elements capable of movement in the axial direction and of rotation about their own axes.

Figure 8:
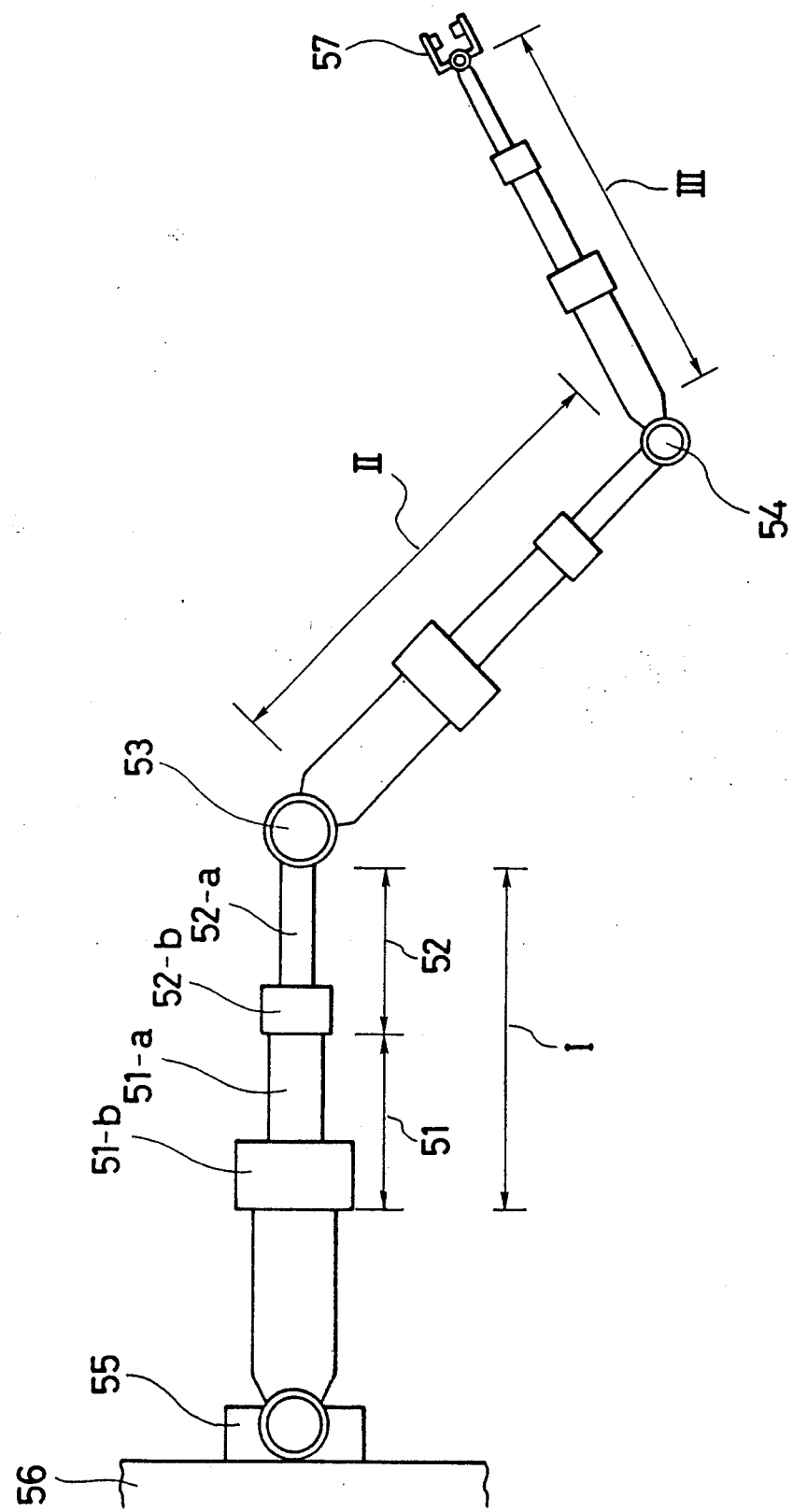
FIG. 8 shows a third embodiment of the electromagnetic actuator set forth in claim 2.

FIG. 8 is a schematic plan view of a third embodiment of the electromagnetic actuator set forth in claim 2. This embodiment is an electromagnetic actuator which consists of a plurality of multi-stage extension type actuators shown in FIG. 7. In FIG. 8, reference numerals 51-a and 51-b respectively denote a cylindrical rod and an electromagnet driving device which in combination form an actuator 51 of a first stage. An actuator 52 of a second stage is composed of an electromagnet driving device 52-b mounted on the distal end of the rod 51-a of the actuator 51 of the first stage and a cylindrical rod 52-a. The cylindrical rod 52-a of the actuator 52 of the second stage is accommodated within the cylindrical rod 51-a of the actuator 51 of the first stage, and the actuators 51 and 52 of the first and second stages in combination constitute a multi-stage extension type actuator I. Similarly structured multi-stage extension type actuators II and III are coupled to the multi-stage extension type actuator I through rotary joints 53 and 54 each having a rotary shaft perpendicular to the axis of the cylindrical rod, to form an electromagnetic actuator which can be used as an extension type manipulator capable of extension and contraction and having a large degree of freedom. In FIG. 8, a reference numeral 55 denotes a rotary joint for joining the multi-stage extension type actuator I to an apparatus body 56, and a reference numeral 57 denotes a grip provided on the distal end of the electromagnetic actuator.

As will be understood from the foregoing description, in the electromagnetic actuator set forth in claim 1, the rod has a cylindrical shape and the core of the electromagnet has an annular ring-like form. Therefore, a highly accurate axially symmetric configuration can be obtained, and a completely axially symmetrical distribution of the magnetic flux can thus be obtained. This reduces the radial force which acts between the electromagnet and the rod, and facilitates control over the axial movement of the rod.

In the electromagnetic actuator set forth in claim 2, the cylindrical rod can be rotated about its own axis in a state in which the movement thereof in the axial direction is restricted or can be moved in the axial direction thereof in a state in which rotation about its axis is suspended by controlling energization and de-energization of the restricting electromagnet.

It is possible to provide a multi-stage extension type electromagnetic actuator capable of rotation about its own axis and having a large effective stroke by constructing the cylindrical rod of the electromagnetic actuator set forth in claim 2 by multi-stage rods and by disposing the electromagnets and the restricting electromagnet for each rod.

Furthermore, it is possible to provide an electromagnetic actuator that can be used as a manipulator having a large degree of freedom by coupling a plurality of multi-stage extension type electromagnetic actuators by means of the rotary joints.

What is claimed is:

1. An electromagnetic actuator comprising:
a cylindrical rod made of a magnetic substance and having a large number of annular teeth formed on an outer surface thereof at a fixed pitch; and
a plurality of annular electromagnets fitted on said cylindrical rod, each of said annular electromagnets having a hollow annular electromagnet core whose inner peripheral intermediate portion is removed and two annular walls are formed on both sides of said inner peripheral intermediate portions, and loosely fit on said cylindrical rod, a large number of annular teeth provided on said annular walls of said hollow annular electromagnet core by the same pitch as that of the annular teeth of said cylindrical rod, and an energizing coil wound along a circumference within said hollow annular electromagnet core, said annular electromagnets being disposed at intervals which ensure that offsets between the annular teeth of said annular electromagnets and said annular teeth of said cylindrical rod gradually increase, said cylindrical rod being driven in an axial direction thereof by energization and de-energization of said electromagnets.

2. An electromagnetic actuator comprising:
 a cylindrical rod made of a magnetic substance, said cylindrical rod having a large number of annular teeth which are formed on an outer surface thereof at a fixed pitch and a plurality of helical grooves which extend in an axial direction of said rod across said annular teeth on the outer surface of said rod and which are formed at a fixed interval on a circumference of said rod;
 a plurality of annular electromagnets fitted on said cylindrical rod; and
 a restricting electromagnet fitted on said cylindrical rod and coupled to said plurality of annular electromagnets, said restricting electromagnet restricting movement of said cylindrical rod in the axial direction thereof, each of said annular electromagnets having a hollow annular electromagnet core whose inner peripheral intermediate portion is removed and two annular walls are formed on both sides of said inner peripheral intermediate portion, and loosely fit on said cylindrical rod, a large number of annular teeth provided on said annular walls of said hollow annular electromagnet core by the same pitch as that of the annular teeth of said cylindrical rod, helical grooves on said annular walls of said hollow annular electromagnet core which extend in the axial direction across said annular teeth and which are disposed at a fixed interval on the circumference of said annular walls and at an inclination angle different from that of said helical grooves of said cylindrical rod, said inclination angle being the ratio of a circumferential component to an axial component of said helical groove, and an exciting coil along the circumference would within said core, said annular electromagnets being disposed at intervals which ensure that offsets between the annular teeth of said annular electromagnets and said annular teeth of said cylindrical rod gradually increase, said cylindrical rod being rotated about its own axis in a state wherein the movement of said cylindrical rod in he axial direction is suspended and being driven in the axial direction thereof in a state wherein rotation of said cylindrical rod about is own axis is suspended.

3. An electromagnetic actuator according to claim 2, wherein an inclination (l/s) of said helical grooves on the outer surface of said cylindrical rod has a circumferential component (l) and an axial component (s) which corresponds to a distance between the adjacent electromagnets int he axial direction, and an inclination (l'/s) of said helical grooves on said annular walls of each of said plurality of annular electromagnets has a circumferential component (l') and an axial component (s), said circumferential component (l') being obtained by deducting a circumferential component (δ) of said helical groove on the surface of said cylindrical rod generated by the movement of said cylindrical rod int he axial direction thereby which is caused by the drive of the adjacent electromagnet from a circumferential component (l) of the helical groove on the surface of said cylindrical rod.

4. An electromagnetic actuator according to claim 2, wherein the circumferential pitch of the helical grooves of said cylindrical rod and the circumferential pitch of the helical grooves on the annular walls of said hollow annular electromagnet core are nK and (n+1) K respectively, and the ratio of the circumferential pitches is n: n+1, wherein K=mδ, m is a number of electromagnets, n is an integer, and δ is a circumferential component of said helical groove on the surface of sad cylindrical rod generated by the movement of said cylindrical rod int eh axial direction thereby which is caused by the drive of the adjacent electromagnet.

5. An electromagnetic actuator according to claim 3, wherein the circumferential pitch of the helical grooves of said cylindrical rod and the circumferential pitch of the helical grooves on the annular walls of said hollow annular electromagnet core are nK and (n+1) K respectively, and the ratio of the circumferential pitches is n: n+1, wherein K=mδ, m is a number of electromagnets, n is an integer, and δ circumferential component of said helical groove on the surface of said cylindrical rod generated by the movement of said cylindrical rod in the axial direction thereby which is caused by the drive of the adjacent electromagnet).

6. An electromagnetic actuator according to claim 2, wherein said cylindrical rod is made up of multi-stage rods which have gradually decreasing outer diameters and which can be set into a bore of said cylindrical rod of a previous stage, an electromagnetic driving unit having the same configuration as that of said annular electromagnets and said restricting electromagnet being disposed in correspondence to the rod of a first stage to drive said rod of said first stage, an electromagnet driving unit having the same configuration as that of said electromagnet driving unit for driving said rod of said first stage being fixed to the distal end of said rod of said first stage to drive the rod of a second stage, and an electromagnet driving unit having the same configuration being fixed to the distal end of the rod of each stage to drive the rod of a subsequent stage in order to provide a multi-stage extension type electromagnetic actuator.

7. An electromagnetic actuator according to claim 3, wherein said cylindrical rod is made of multi-stage rods which have gradually decreasing outer diameter and which can be set into a bore of said cylindrical rod of a previous stage, an electromagnetic driving unit having the same configuration as that of said annular electromagnets and said restricting electromagnet being disposed in correspondence to the rod of a first stage to drive said rod of said first stage, an electromagnet driving unit having the same configuration as that of said electromagnet driving unit for driving said rod of said first stage being fixed to the distal end of said rod of said first stage to drive the rod of a second stage, and an electromagnet driving unit having the same configuration being fixed to the distal end of the rod of each stage to drive the rod of a subsequent stage in order to provide a multi-stage extension type electromagnetic actuator.

8. An electromagnetic actuator according to claim 4, wherein said cylindrical rod is made up of multi-stage rods which have gradually decreasing outer diameters and which can be fitted on top of the other, an electromagnet driving unit having the same configuration as that of said annular electromagnets and said restricting electromagnet being disposed in correspondence to the rod of a first stage to drive said rod of said first stage, an electromagnet driving unit having the same configuration as that of said electromagnet driving unit for driving said rod of said first stage being fixed to the distal end of said rod of said first stage to drive the rod of a second stage, and an electromagnet driving unit having the same configuration being fixed tot he distal end of the rod of each stage to drive the rod of a subsequent stage in order to provide a multi-stage extension type electromagnetic actuator.

9. An electromagnetic actuator according to claim 2, wherein both circumferential pitches of helical grooves on the outer surface of said cylindrical rod and the helical grooves on the annular walls of said hollow annular electromagnet core take a same value K, and the ration of said both pitches is 1:1, wherein K=mδ, m is a number of electromagnets, δ is a circumferential component of said helical groove on the surface of said cylindrical rod generated by the movement of said cylindrical rod in the axial direction thereby which is caused by the drive of the adjacent electromagnet.

10. An electromagnetic actuator according to claim 3, wherein both circumferential pitches of helical grooves on the outer surface of said cylindrical rod and the helical grooves on the annular walls of said hollow annular electromagnet core take a same value K, and the ratio of said both pitches is 1:1, wherein K=mδ, m is a number of electromagnets, δ is a circumferential component of said helical groove on the surface of said cylindrical rod generated by the movement of said cylindrical rod in the axial direction thereby which is caused by the drive of the adjacent electromagnet.

11. An electromagnetic actuator according to claim 5, wherein said cylindrical rod is made up of multi-stage rods which have gradually decreasing outer diameters and which can be fitted on top of the other, an electromagnet driving unit having the same configuration as that of said annular electromagnets and said restricting electromagnet being disposed in correspondence to the rod of a first stage to drive said rod of said first stage, an electromagnet driving unit having the same configuration as that of said electromagnet driving unit for driving said rod of said first stage being fixed to the distal end of said rod of said first stage to drive the rod of a second stage, and an electromagnet driving unit having the same configuration being fixed to the distal end of the rod of each stage to drive the rod of a subsequent stage in order to provide a multi-stage extension type electromagnetic actuator.

12. An electromagnetic actuator according to claim 6, wherein said plurality of multi-stage extension type electromagnetic actuators are coupled to each other by means of rotary joints to form a multi-stage extension type electromagnetic actuator which is capable of bending.

13. An electromagnetic actuator according to claim 7, wherein said plurality of multi-stage extension type electromagnetic actuators are coupled to each other by means of rotary joints to form a multi-stage extension type electromagnetic actuator which is capable of bending.

14. An electromagnetic actuator according to claim 8, wherein said plurality of multi-stage extension type electromagnetic actuators are coupled to each other by means of rotary joints to form a multi-stage extension type electromagnetic actuator which is capable of bending.

15. An electromagnetic actuator according to claim 11, wherein said plurality of multi-stage extension type electromagnetic actuators are coupled to each other by means of rotary joints to form a multi-stage extension type electromagnetic actuator which is capable of bending.

* * * * *